(12) United States Patent
Chaudhri et al.

(10) Patent No.: US 10,091,345 B2
(45) Date of Patent: Oct. 2, 2018

(54) MEDIA OUT INTERFACE

(75) Inventors: Imran A. Chaudhri, San Francisco, CA (US); Vincenzo DeMarco, San Jose, CA (US); Scott Herz, Santa Clara, CA (US); Scott Forstall, Mountain View, CA (US); Gregory N. Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1853 days.

(21) Appl. No.: 11/849,911

(22) Filed: Sep. 4, 2007

(65) Prior Publication Data
US 2009/0061841 A1    Mar. 5, 2009

(51) Int. Cl.
*H04M 3/00*    (2006.01)
*H04M 1/725*    (2006.01)
*H04L 29/06*    (2006.01)

(52) U.S. Cl.
CPC .... *H04M 1/72527* (2013.01); *H04L 65/1059* (2013.01); *H04M 1/72533* (2013.01)

(58) Field of Classification Search
None
See application file for complete search history.

(56) References Cited

U.S. PATENT DOCUMENTS

| | | | |
|---|---|---|---|
| 5,880,732 A * | 3/1999 | Tryding | 715/810 |
| 6,323,846 B1 | 11/2001 | Westerman et al. | |
| 6,570,557 B1 | 5/2003 | Westerman et al. | |
| 6,677,932 B1 | 1/2004 | Westerman | |
| 6,714,233 B2 * | 3/2004 | Chihara et al. | 348/14.02 |
| 6,888,536 B2 | 5/2005 | Westerman et al. | |
| 7,016,704 B2 * | 3/2006 | Pallakoff | 455/566 |
| 7,058,356 B2 * | 6/2006 | Slotznick | 455/3.05 |
| 7,062,291 B2 * | 6/2006 | Ryley et al. | 455/556.1 |
| 7,152,093 B2 * | 12/2006 | Ludwig et al. | 709/204 |
| 7,190,336 B2 * | 3/2007 | Fujisawa | 345/81 |
| 7,292,588 B2 * | 11/2007 | Milley et al. | 370/401 |
| 7,330,737 B2 * | 2/2008 | Mahini | 455/557 |
| 7,715,872 B2 * | 5/2010 | Kim et al. | 455/553.1 |
| 7,715,873 B1 * | 5/2010 | Biere et al. | 455/557 |
| 8,081,964 B1 * | 12/2011 | Enzmann et al. | 455/420 |
| 8,434,114 B2 * | 4/2013 | Inoguchi | 725/60 |
| 8,704,866 B2 * | 4/2014 | Igoe | 348/14.04 |
| 2002/0045438 A1 * | 4/2002 | Tagawa et al. | 455/412 |
| 2002/0119800 A1 * | 8/2002 | Jaggers et al. | 455/550 |
| 2003/0073411 A1 * | 4/2003 | Meade, II | 455/70 |
| 2005/0114774 A1 * | 5/2005 | Berryman | 715/700 |

(Continued)

OTHER PUBLICATIONS

U.S. Appl. No. 60/945,904, filed Jun. 22, 2007, Inventors John Graessley, Dallas Blake De Atley and John Andrew Wright, 74 pages.

*Primary Examiner* — Willie J Daniel, Jr.
(74) *Attorney, Agent, or Firm* — Kilpatrick Townsend & Stockton LLP

(57) ABSTRACT

Methods, systems, and computer-readable medium for providing a media out interface. In one implementation, a method is provided. The method includes, at a host device, detecting a mobile device coupled to the host device, and displaying on a display device coupled to the host device an interface including interface elements, which can be manipulated by commands received from the mobile device or another device, wherein the interface enables control of the display of content received from the mobile device and displayed on the display device.

21 Claims, 12 Drawing Sheets

(56) References Cited

U.S. PATENT DOCUMENTS

| | | | |
|---|---|---|---|
| 2006/0083194 A1* | 4/2006 | Dhrimaj et al. | 370/328 |
| 2006/0160570 A1* | 7/2006 | Kamarainen | 455/557 |
| 2007/0042809 A1* | 2/2007 | Angelhag | 455/569.1 |
| 2008/0122796 A1* | 5/2008 | Jobs et al. | 345/173 |
| 2008/0304486 A1 | 12/2008 | Graessley et al. | |
| 2008/0307102 A1 | 12/2008 | Galloway et al. | |
| 2008/0307109 A1 | 12/2008 | Galloway et al. | |
| 2008/0318550 A1 | 12/2008 | DeAtley | |
| 2010/0220250 A1* | 9/2010 | Vanderwall et al. | 348/837 |

\* cited by examiner

MEDIA OUT INTERFACE

TECHNICAL FIELD

The subject matter of this patent application is generally related to electronic devices.

BACKGROUND

Conventional mobile devices often include a user interface to view and manipulate content on the devices such as ringtones, graphics, websites, games, email, text messages, music, and movies to name a few examples. In general, mobile device users can download mobile content, services, and other applications from other users or websites. For example, users can download wireless application protocol (WAP) services to connect to the Internet to check email, track stock market prices, receive sports results, check news headlines, download music, etc. The downloaded content can generally provide the user with entertainment, convenience, and broader device functionality.

SUMMARY

A technique, method, apparatus, and system are described to provide a media out interface. In general, in one aspect, a method is provided. The method includes, at a host device, detecting a mobile device coupled to the host device, and displaying on a display device coupled to the host device an interface including interface elements, which can be manipulated by commands received from the mobile device or another device, wherein the interface enables control of the display of content received from the mobile device and displayed on the display device.

Implementations can include one or more of the following features. The interface can be displayed as an overlay over the received content displayed on the display device. The received content can be media content, and the interface elements can allow one or more of changing a volume level, pausing, stopping, skipping to another point in the media content, or skipping to other media content.

In one aspect, a method is provided. The method includes, at a mobile device, detecting a host device coupled to the mobile device, where the host device is coupled to a display device, transmitting content playing on the mobile device to the host device for display on the display device, and transmitting a command to the host device to control the display of the transmitted content displayed on the display device.

Implementations can include one or more of the following features. The mobile device can be coupled to the host device through a docking device. The mobile device can include a multi-touch-sensitive display.

In one aspect, a method is provided. The method includes, at a mobile device, detecting a host device coupled to the mobile device, where the mobile device includes telephony functions, and a display device is coupled to the host device. The method further includes, at a mobile device, transmitting media content playing on the mobile device to the host device for display on the display device, and receiving a command for controlling the media content playing on the mobile device.

Implementations can include one or more of the following features. The mobile device can be coupled to the host device through a docking device. The command can be sent from the host device, where the host device is in wireless communication with a remote control. The command can be sent by wireless communication from a remote control. The method can further include displaying on the mobile device an interface for controlling the media content playing on the mobile device. The mobile device can include a multi-touch-sensitive display.

In one aspect, a method is provided. The method includes, while playing media content on a display device coupled to a docking device coupled to a mobile device, receiving notice of an event occurring on the mobile device, pausing the playing of the media content on the display device, and displaying information associated with the event on the display device.

Implementations can include one or more of the following features. The event occurring on the mobile device can be the receipt of a call from a caller on the mobile device, and the information associated with the event can be information associated with the caller. Displaying information can include displaying information in one or more overlays over the media content on the display device. The one or more overlays can be partially transparent. The information associated with the caller can include one or more of a name, a phone number, a type of phone number, an image, or a graphic. The method can include displaying an interface that includes an interface element for answering the call and an interface element for declining the call. The method can include, while the media content is paused and the information is displayed, receiving first input requesting that the call be declined, and in response to the first input, continuing the playing of the media content on the display device. The method can include, while the media content is paused and the information is displayed, receiving first input requesting that the call be answered, and after the call is connected in response to the first input, displaying an interface that includes an interface element for ending the call and an interface element for increasing the volume of the call. The first input can be received at the mobile device. The first input can be received at a remote control, where the remote control transmits a signal by wireless communication to the display device, and the signal is associated with the first input. The method can include, while the call is connected, receiving second input requesting that the call be disconnected, and after the call is disconnected in response to the second input, continuing the playing of the media content on the display device.

In one aspect, a system is provided. The system includes a docking device, a mobile device coupled to the docking device, and a host device coupled to the docking device, wherein the host device is configured to receive commands from the mobile device or another device for controlling displaying of content playing on the mobile device. Implementations can include a display device coupled to the host device, wherein the display device is configured to display content playing on the mobile device.

DETAILED DESCRIPTION

Example Mobile Device

Figure 1A:
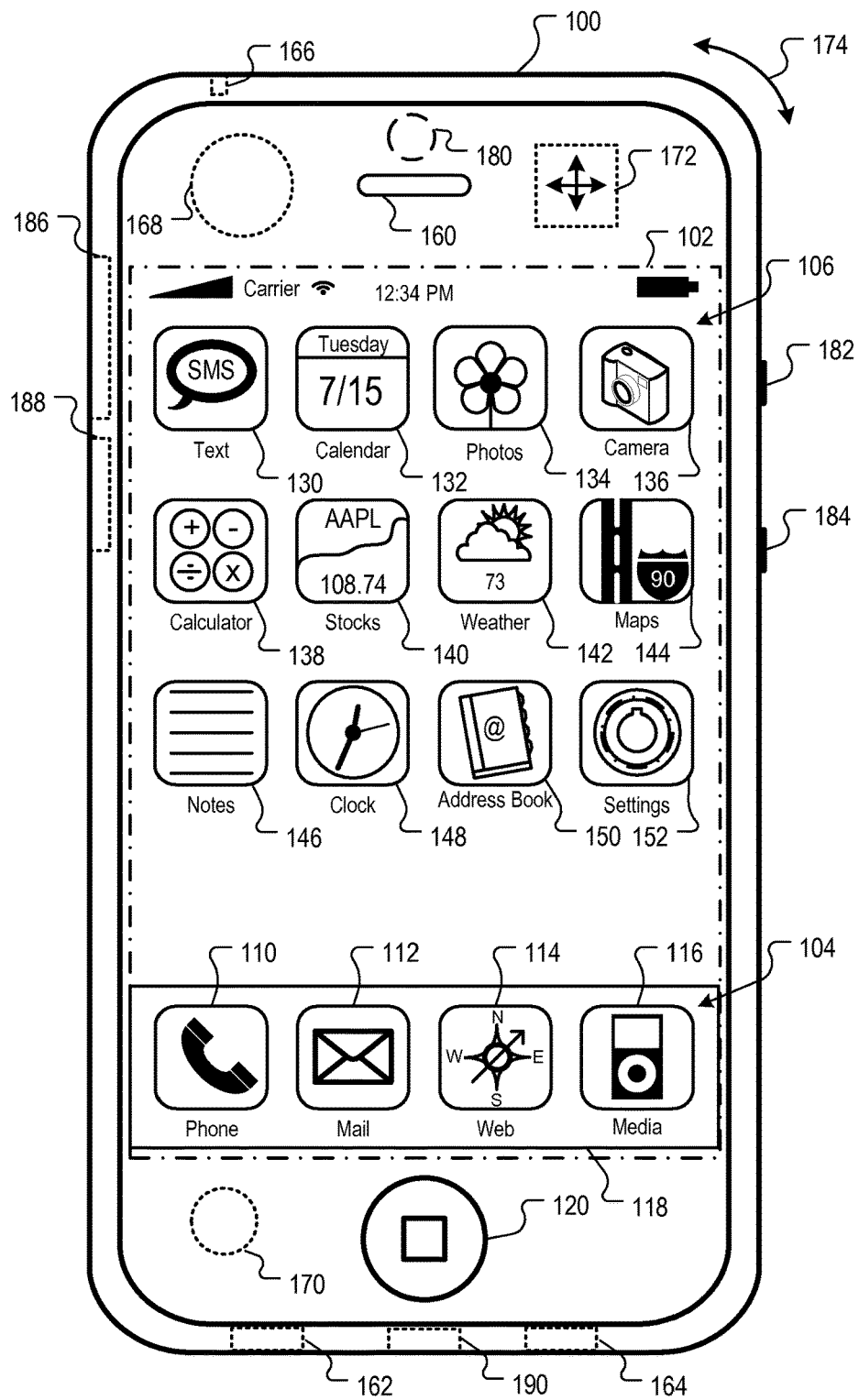
FIG. 1A is a block diagram of an example mobile device.

FIG. 1A is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices. While reference is made to a mobile device and mobile device architecture, methods, apparatus, computer program products, and systems disclosed can be implemented in other devices having the same or different architectures.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
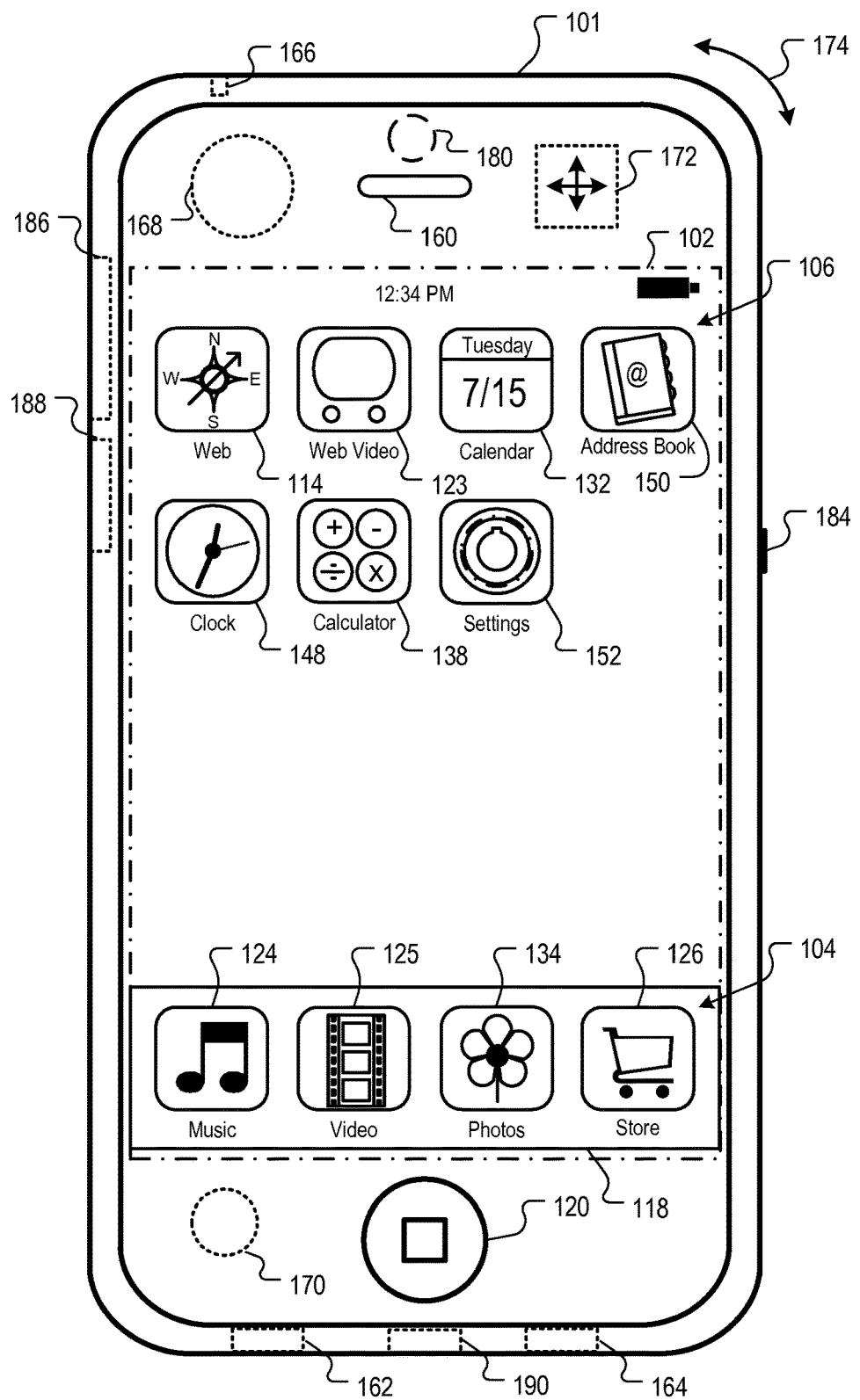
FIG. 1B is a block diagram of an example mobile device.

FIG. 1B is a block diagram of an example mobile device 101. The mobile device 101 can be, for example, a handheld computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include one or more input/output (I/O) devices 160, 162, 164, and 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

Figure 2:
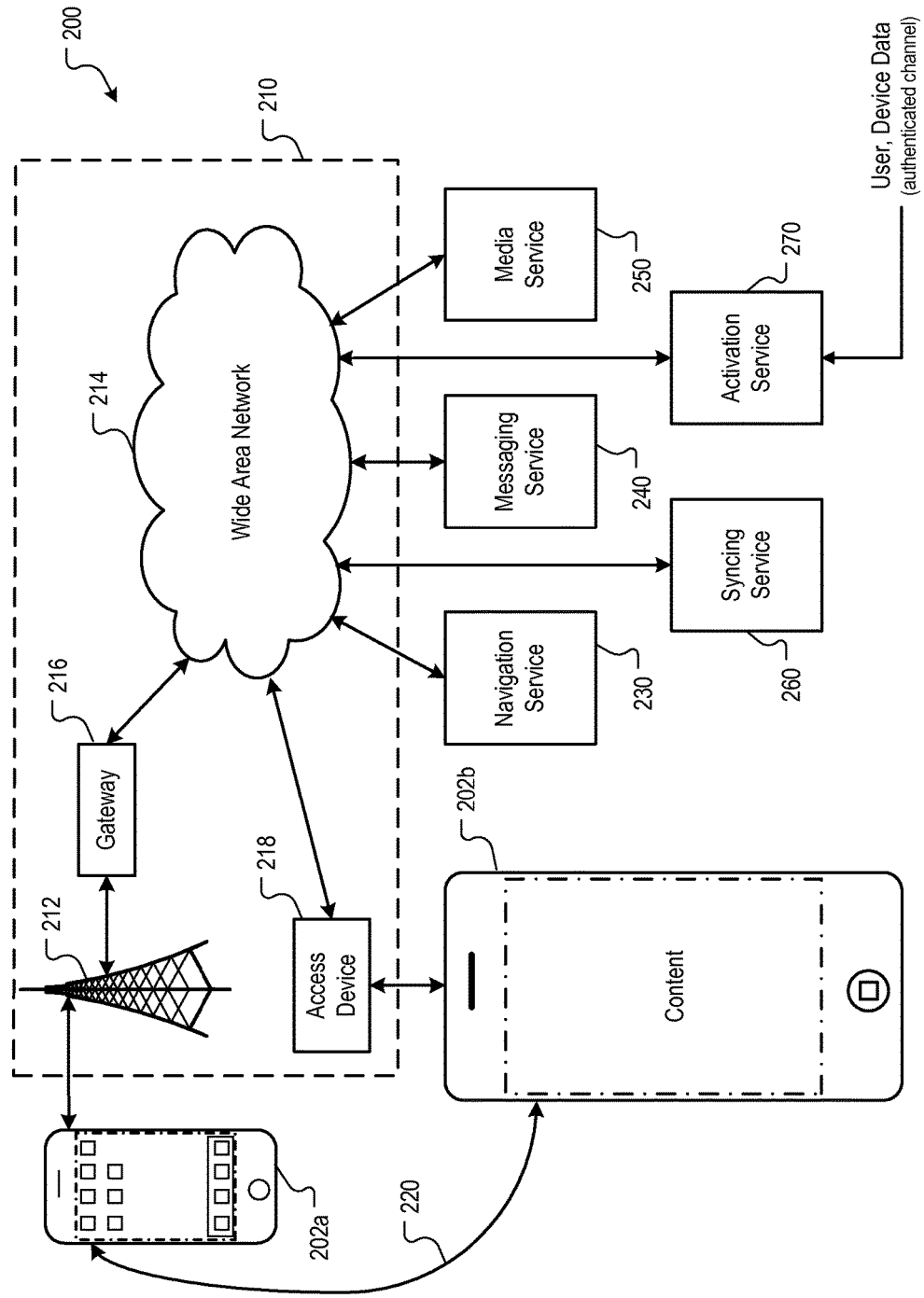
FIG. 2 is a block diagram of an example network operating environment for the mobile devices of FIGS. 1A-1B.

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
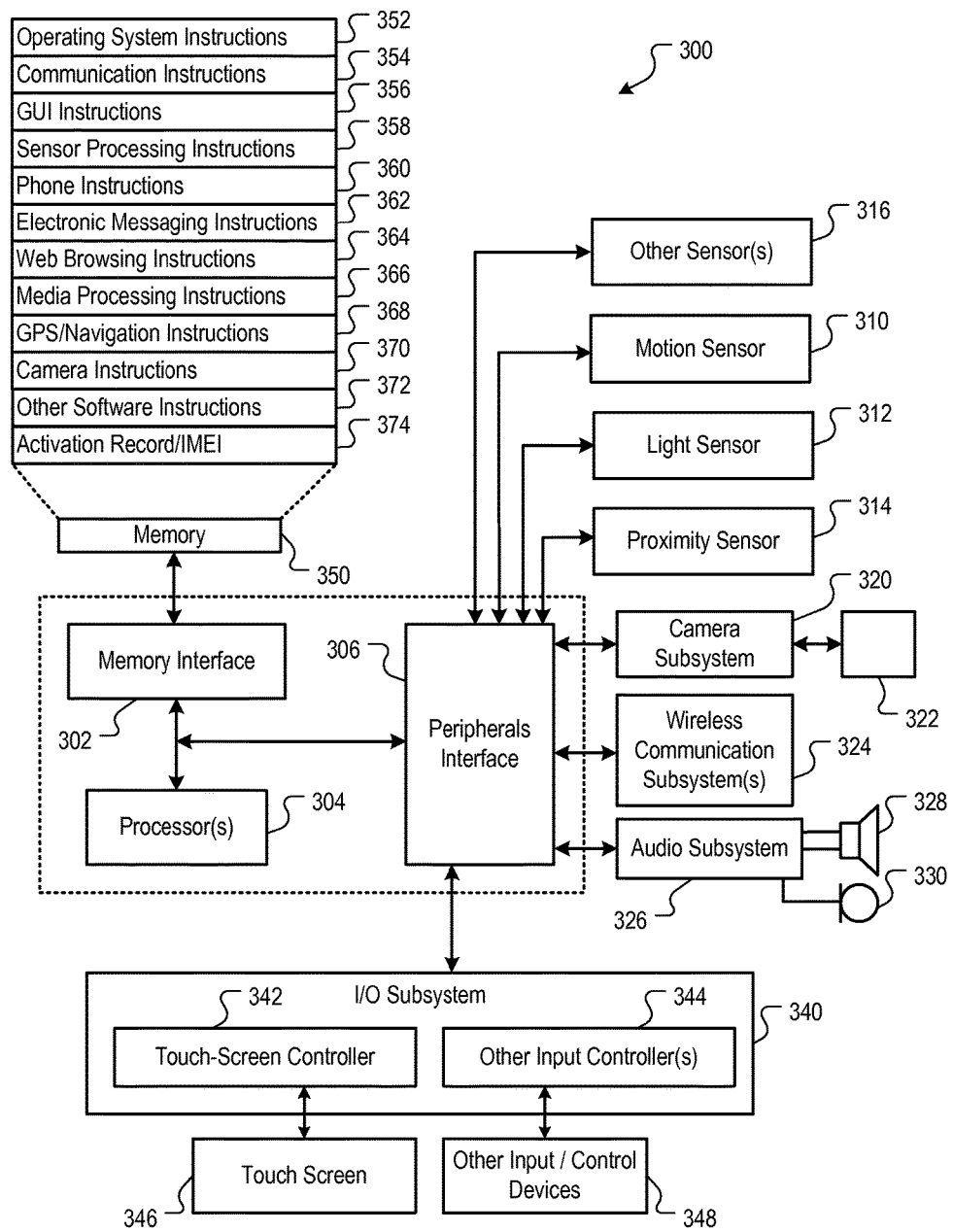
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
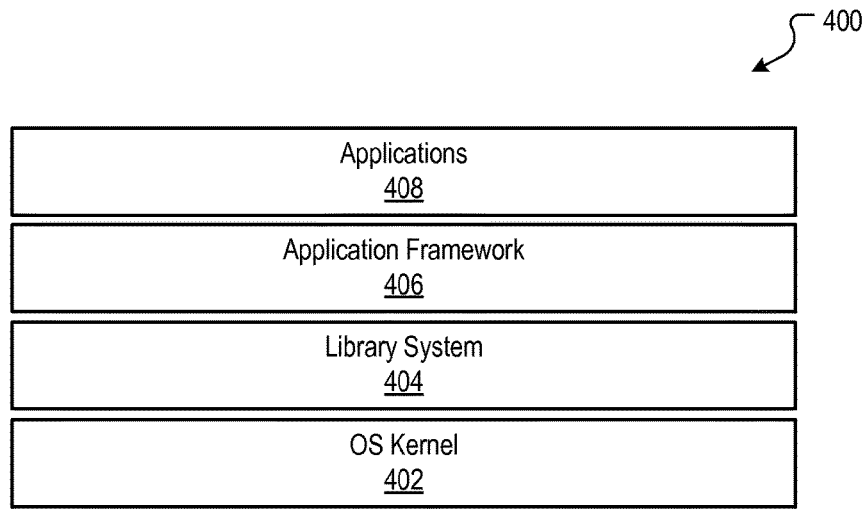
FIG. 4A illustrates an example implementation of a software stack for the mobile devices of FIGS. 1A-1B.

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406, and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services for applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
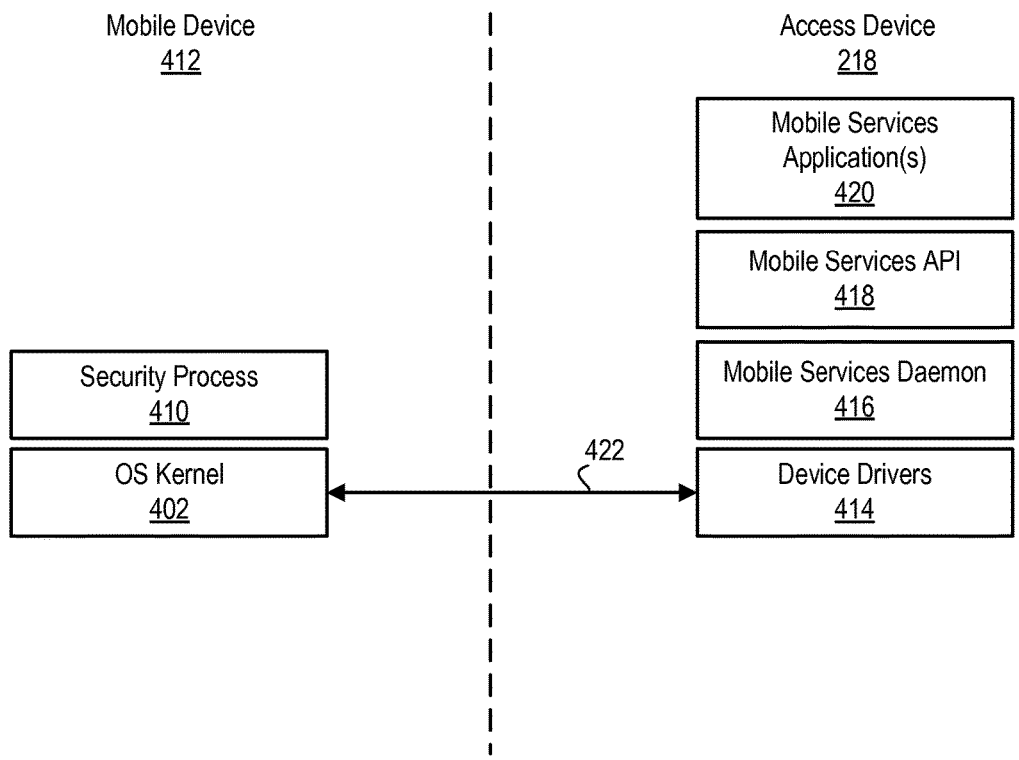
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418 and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In other implementations, the mobile device 412 and access device 218 include wireless transceivers for establishing a wireless link (e.g., Wi-Fi). The drivers 414 and kernel 402 detect the connection and alert the security process 410 and mobile services daemon 416 of the connection status. Once the connection is established, certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Coupling Detection

Figure 5:
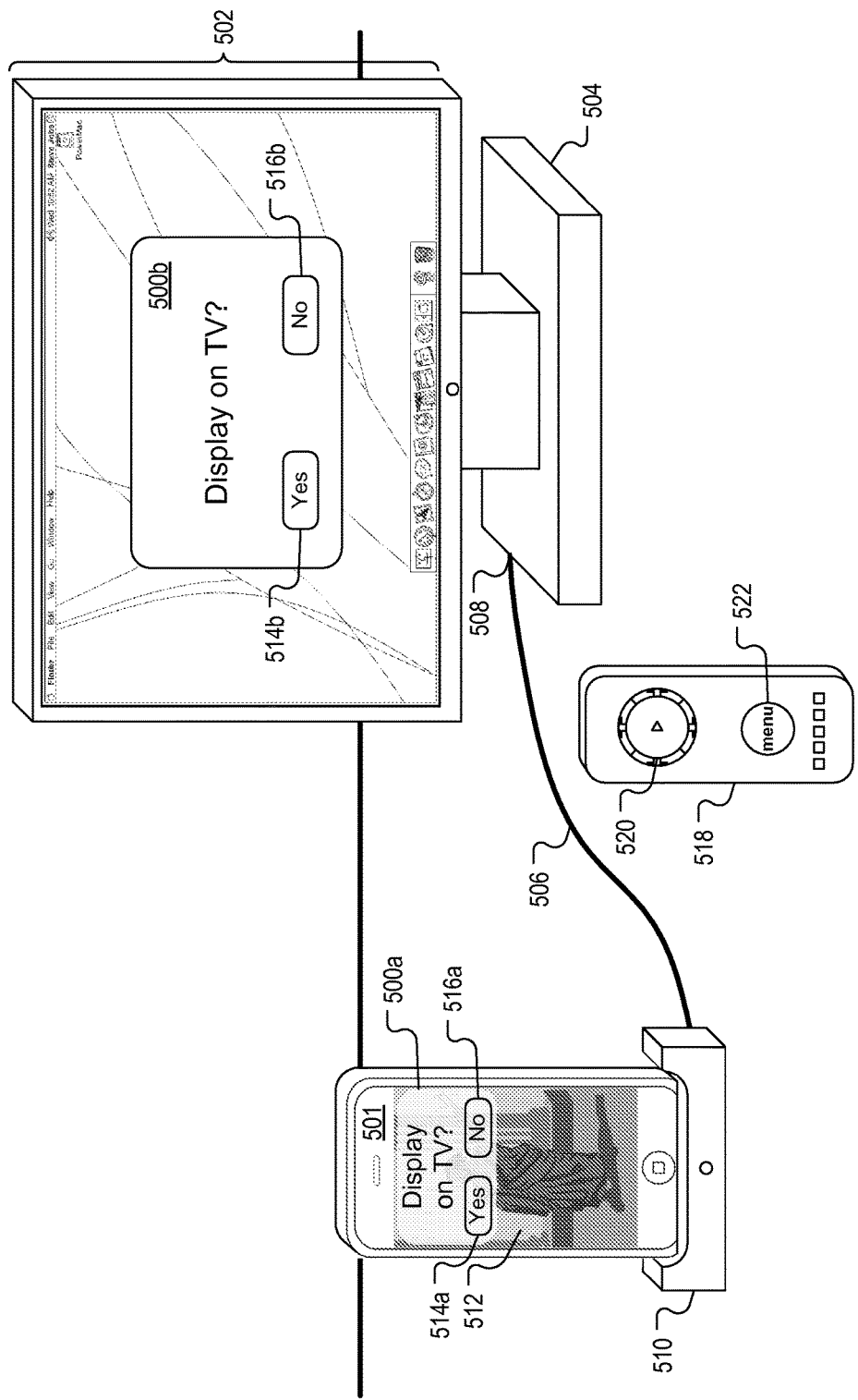
FIG. 5 illustrates an example dialog box presented to a user on a display device.

FIG. 5 illustrates an example dialog box 500b presented to a user on a display device 502. For example, the dialog box 500b can be a transparent overlay displayed over content currently shown on the display device 502. The display device 502 can be a computer monitor (as shown), a television, a video monitor, or other video-capable display device. In some implementations, a dialog box 500a is presented to the user on the mobile device 501. The dialog box 500a can be a transparent overlay displayed over content currently shown on the mobile device 501. In some implementations, both dialog boxes 500a and 500b are presented to the user. In other implementations, only one of the two dialog boxes 500a and 500b are presented to the user.

In the example shown, the dialog box 500b is presented to the user on the display device 502 using a host device 504. The host device 504 may be a computer communicatively coupled to display device 502 or any other device capable of displaying or presenting content. In the case of a television, the host device 504 may be the television (e.g., digital, analog, high definition), or in some cases, a cable provider with access to the television via a cable box (not shown). In some implementations, the host device may be a mobile device 501 (e.g., mobile device 100 or 101). For example, a mobile device 501 can determine media content formatting settings for one or more display devices depending on how the mobile device 501 is connected with the display device (e.g., display device 502). As such, the mobile device 501 may transmit formatting instructions or signals to display device 502, for example.

The display content presented on display device 502 can generally originate from a mobile device 501 over some communicative link, such as a cable 506. For example, content can originate from a mobile device 501, can be transmitted to the display device 502 over the cable 506, and can be rendered on display device 502. In an example operational mode, the host device 504 can detect the presence of the connected link (here shown as cable 506), and upon detection of the link, can display the dialog box 500b to a user. In some implementations, the mobile device 501 can communicate over a wireless connection with display device 502.

In one example, the host device 504 can detect the presence of the cable 506 when it is connected to a video input connector 508. As shown, the video input connector 508 is connected to cable 506, which is connected to a docking device 510 coupled to the mobile device 501. In some implementations, the cable 506 can be connected directly to the mobile device 501 without the docking device 510. In some implementations, the cable 506 (e.g., a smart cable) can contain circuitry (e.g., a built-in microprocessor) to detect when the cable 506 is coupled to a device (e.g., the mobile device 501 or the docking device 510). In one example, the cable 506 can detect that it is connected, on one end, to the mobile device 501 and notify, on the other end, the host device 504 of the detected mobile device 501. The video input connector 508 can be configured as, for example, an audiovisual (AV) input connector for receiving an analog video signal (e.g., for a television) or as an S-Video connector for receiving an S-Video signal (e.g., for a computer monitor or other video capable device). In some implementations, invoking an application such as the iTunes™ software application on host device 504 can initiate the detection of the cable 506.

Although a single cable 506 is depicted in FIG. 5, multiple cables can be used, and in some implementations, one cable can have multiple outputs. For example, the cable 506 may include an S-video portion and an AV portion. In some implementations, the host device 504 can detect (e.g., using a smart cable) the presence of mobile device 501 when a user docks the mobile device 501 in the docking station 510. In other implementations, the host device 504 can detect the presence of mobile device 501 when a user directly connects the cable 506 (e.g., a smart cable) to the mobile device 501.

As described above, in some implementations, the host device 504 can detect the presence of a wireless connection (not shown) or a wired connection, e.g., through a cable 506, with a mobile device 501. Mobile device 501 can be wirelessly coupled to host device 504 using various wireless communication protocols, such as WiMax, Wi-Fi, 3G, or Bluetooth™ to name a few examples. In general, the mobile device user can communicatively couple the mobile device 501 to the docking device 510, the cable 506, or a wireless connection (not shown) to transmit video images, text, controls, photos, menus, and other content to host device 504.

In response to detecting the presence of the cable 506 (or a wireless equivalent), the host device 504 can display the dialog box 500b on display device 502. In the depicted example, the dialog box 500b solicits an input from the user related to requesting display of media content on the display device 502. In some implementations, the content in the interface presented may depend on the current context of the mobile device 501. For example, if the user is listening to audio tracks using an audio application on the mobile device 501 and chooses to dock the mobile device 501 as shown in FIG. 5, the interface displayed on the display device 502 may include a dialog box to exit the audio application, or the interface may include controls to play the audio content. Similarly, if the user is actively using an application on the mobile device 501 when connecting to display device 502, content related to the active application can be presented on display device 502.

The mobile device 501 shown in FIG. 5 depicts a frame 512 of a movie. The depicted frame 512, and any previous or subsequent frames, controls, or other media content, can be transmitted for display (e.g., rendering) on the display device 502. In general, the user can view any number of content items (e.g., files, media, controls, menus, displays, etc.) from mobile device 501 on display device 502. As such, any permutation of the content displayed on mobile device 501 can be rendered on display device 502. In some implementations, the user can manually configure the content that can be transmitted or streamed from the mobile device 501 to display device 502. For example, the user can be presenting media content (e.g., video, audio, or photos) to a large group using mobile device 501, but rendered on display device 502. In this example, the user may not wish to be interrupted and can configure the mobile device 501 to not "broadcast" or otherwise interrupt the display device 502 with the user's personal mobile device content (e.g., received phone calls, received email, received SMS, dialog boxes, or interfaces, etc.).

The dialog boxes 500a and 500b can also include informational text, user interface controls, or other input buttons. In the depicted example, dialog boxes 500a and 500b each present a question asking if the user would like to display, for example, media content on the display device 502. In this example, the user is also presented with yes buttons 514a and 514b and no buttons 516a and 516b. The user can select the buttons using the mobile device 501 or a remote control 518 to indicate preferences. For example, if the user wishes to view the media content on display device 502, he or she may select a yes button 514a or 514b, and the media content can be presented on display device 502. Alternatively, if the user does not wish to view the media content on display device 502, he or she may select a no button 516a or 516b, and the media content will not be displayed on display device 502. In some implementations, the user may make any or all selections directly on a multi-touch sensitive display of the mobile device 501 (while the device is docked or undocked, wired or wireless) or may make any or all selections using a wireless remote control 518.

In some implementations, the user can interact with dialog box 500b using a separate remote control 518. For example, the host device 504 can be in wireless communication with remote control 518, such that selections made on device 518 can be executed on the mobile device 501 and displayed on display device 502. In some implementations, the user can use a wireless remote control 518 to send commands indicating viewing preferences for host device 504. In general, the user can use the wireless remote control 518 to control the content on display device 502, such as when a user uses a wireless remote control to control video content (e.g., DVD content) rendered on a television. In addition, user actions on remote control 518 may be forwarded to display device 502 and/or mobile device 501. For example, the user can use the remote control 518 to wirelessly communicate preferences or selections to the mobile device 501. As such, the input can be wirelessly received in the mobile device 501 and further, can be transmitted to host device 504 to perform the user-specified action.

In some implementations, the content displayed on host device 504 can be controlled by a user through software. For example, upon detection of the cable 506, the host device 504 may run software for displaying, transmitting, or controlling content on display device 502. The software may include mobile services applications, such as iTunes™. In some implementations, the iTunes™ software can be used to manage display information sent to display device 502.

In some implementations, remote control 518 can include controls 520. The controls 520 can include buttons for navigating around the dialog box 500b. For example, the user can use the controls 520 to toggle between the yes button 514b and the no button 516b. As shown in FIG. 5, a menu control 522 can also be included. The menu control 522 can be used to select preferences for the display device 502. For example, the user can use menu control 522 to configure the display device 502 format. In some implementations, one or more formatting options can be presented to the user on display device 502 upon tethering or otherwise connecting the display device 502 with mobile device 501. For example, the user may be presented with an option to set the display device 502 to present content in a widescreen format, a letterbox format (e.g., masked areas above and below the picture area), a pillarbox format (e.g., masked areas left and right of the picture area), a windowbox format (e.g., masked areas surrounding the picture area), a fit-to-screen format (e.g., changing the aspect ratio of the content to match the aspect ratio of the display device 502), or other display options. In some implementations, one or more format settings for the display device 502 are automatically set when a user communicatively couples the mobile device 501 to the display device 502 or responds positively to the query in dialog box 500a or 500b. In some implementations, both the mobile device 501 and the remote control 518 can be used to manually set format settings for the display device 502.

In some implementations, menu control 522 can be used to modify the size, contrast, brightness, resolution, user interface control placement (e.g., dialog boxes, interfaces, or incoming mobile device content), and other AV settings. For example, the user can use menu control 522 to modify the position where one or more dialog boxes or interfaces are displayed on the display device 502.

In some implementations, the user may pre-configure mobile device 501 for displaying content on display device 502. For example, the user may configure a mobile device 501 to enable video transmission functionality before connecting the mobile device 501 to cable 506. In some implementations, the user can enable video transmission functionality after connecting the mobile device 501 to display device 502, for example.

In some implementations, the mobile device 501 can transmit audio content to display device 502. For example, cable 506 can be configured to transmit both audio and video content from mobile device 501 to display device 502. Audio content can include speaker settings, streaming audio, digital or analog audio content, ambience effects (e.g., reverb), and other audio data or controls. In some implementations, the mobile device 501 or cable 506 can determine whether the audio will be provided to a speaker, a set of headphones, or other audio output device. The determination can trigger mobile device 501 or an audio output component on host device 504 to adjust the audio signal based on the type of audio device that will receive the audio signal. For example, after connecting mobile device 501 to an audio output device, the audio signal can be amplified or attenuated, as appropriate, based on an acceptable range of input audio signal strengths for the receiving audio output device. In some implementations, the user can connect the mobile device 501 with a display device 502 to playback video, but may listen to the audio on the mobile device 501 with headphones, for example. For example, while using mobile device 501 remotely, the user can configure the mobile device 501 to display video content wirelessly on display device 502 while playing audio content matching the display content on the mobile device 501 through the audio jack 166.

In some implementations, a host device 504 may recognize a particular cable type upon connection of the cable 506 to the display device 502. For example, the host device 504 may recognize that a USB cable has been connected to the display device 502. As such, the host device 504 can be configured (manually or automatically) to receive transmissions in a USB format. In some implementations, the user can connect the mobile device 501 to a cable 506 or a docking station 510 coupled to a display device 502 and begin using the display device 502 without configuring either device, e.g., by using a smart cable coupled to the display device 502. For example, the cable can contain built-in functionality (e.g., circuitry) to detect a type of transmission and can self configure to send/receive that type of transmission to/from the display device 502. In some implementations, the cable can convert signals from one standard into another. For example, the cable may allow an Ethernet device to work through a USB connector. In general, the smart cable can detect what type of content (e.g., video stored on the mobile device, streaming video, audio, digital photographs, etc.) mobile device 501 is providing to display device 502, for example.

As another example, the user can be presented with one or more options to choose a type of encoding/transmission system for media content upon connection of the mobile device 501 to a display device 502. For example, if the display device 502 is a television, the user can select a Phase Alternating Line (PAL) encoding system, a National Television System Committee (NTSC) system, a Sequential Color with Memory (SECAM) system, or other system depending on the location of the device or availability of the broadcast system.

In some implementations, the encoding and transmission system may be automatically detected or selected by the display device 502 or the mobile device 501. For example, the display device 502 or the host device 504 may have region identification information specifying the setting for a particular encoding or transmission system used by the broadcast system in that region. In other implementations, the encoding and transmission system can be detected or selected by the cable 506, e.g., a smart cable. In some implementations, a smart cable can also detect or select format settings (e.g., letterbox or pillarbox) for the display device 502.

In some implementations, the mobile device 501 or the docking device 510 can include one or more sensors, which can automatically detect ambient conditions in the room. For example, the mobile device 501 can include an ambient light sensor 170 (FIGS. 1A-1B) to detect the level of brightness of the room. In response to the light detection, the mobile device 501 can send a command to the host device 504 to adjust the brightness of the display device 502.

Returning to the illustrated implementation in FIG. 5, the user can use a control 520 on remote control 518 to select the yes button 514b or the no button 516b on the dialog box 500b. The selection can be transmitted to the mobile device 501 and implemented. Likewise, the user can select the yes button 514a or the no button 516a of the dialog box 500a displayed on the mobile device 501. The mobile device 501 can transmit the media content via cable 506 to update the display device 502. If the user selects a no button 516a or 516b, video content from the mobile device 501 may not be presented on the display and the dialog box 500a or 500b, respectively, may be minimized or exited. If the user selects a yes button 514a or 514b, media content (e.g., video content) from the mobile device 501 can be presented on display device 502. The following FIGS. 6-9 describe various content originating from mobile device 501 that can be displayed on a display device.

Media Out Interface

Figure 6:
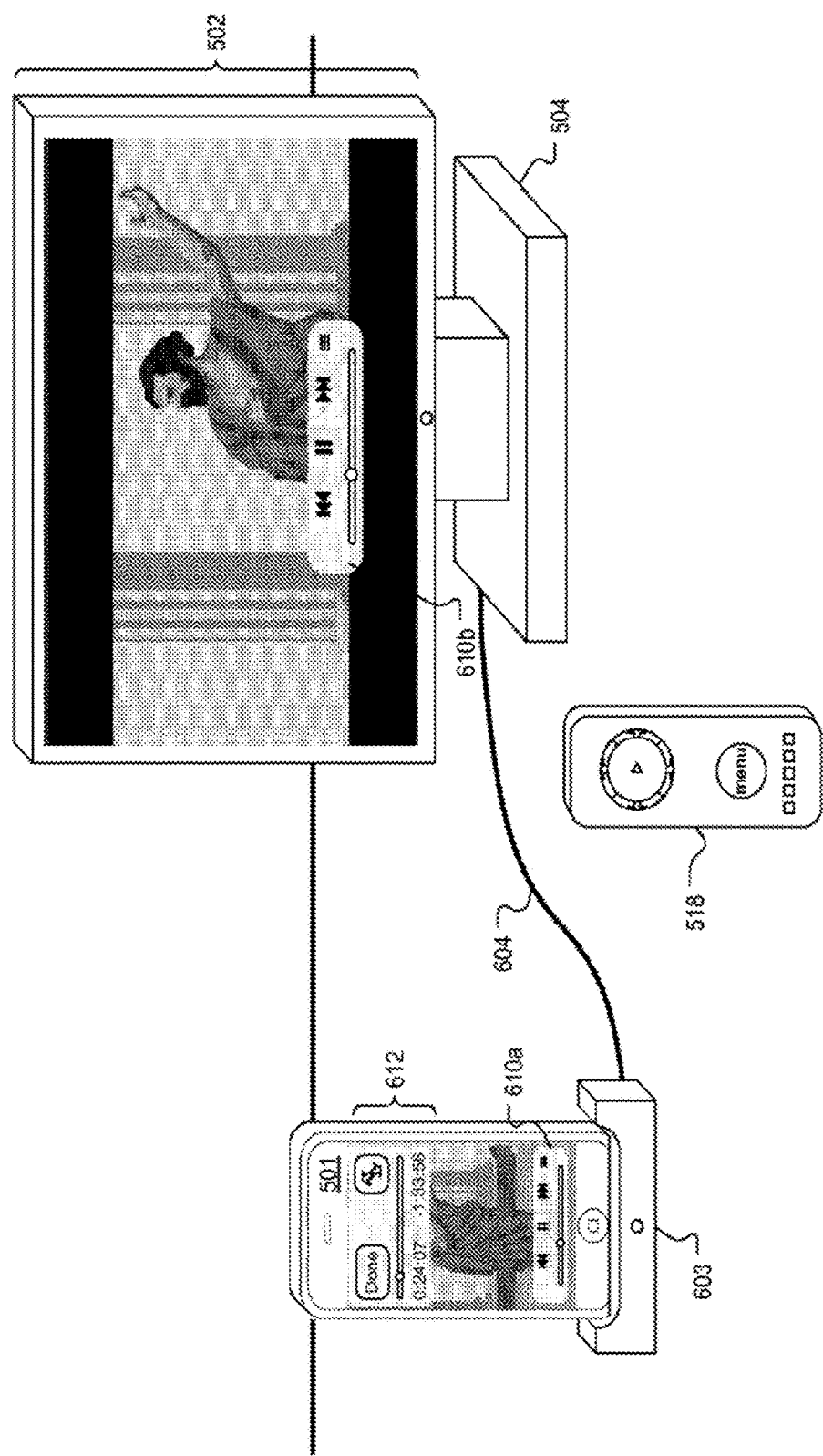
FIG. 6 illustrates an example media out interface displayed on a display device when the mobile device is first coupled to a host device coupled to the display device.

FIG. 6 illustrates an example media out interface 610b displayed on a display device 502 when the mobile device 501 is first coupled to a host device 504 coupled to the display device 502. For example, a mobile device 501 can act as a media output device by transmitting media content (e.g., video content) playing on the mobile device 501 to a display device 502, similar to a DVD player playing a DVD. Media content can include stored video, streaming video, stored audio, streaming audio, digital photographs, text, controls, and other audio or visual content. In some implementations, the media content from mobile device 501 can be sent through a docking device 603 over a cable 604 a host device 504 coupled to a display device 502. In the example shown, the user of mobile device 501 has selected to view video content on display device 502. For example, the user may have selected yes to display the video content on the display, as shown in the dialog box 500a or 500b (FIG. 5). The result of selecting yes from the dialog box 500a or 500b may be the display of video content on display device 502.

In an example operational mode, after mobile device 501 is communicatively coupled to display device 502, the mobile device 501 can send video content for presentation on the display device 502. For example, a media out interface (e.g., media out interfaces 610a) can be selectable on the mobile device 501 as well as replicated on display device 502. The replicated media out interface is depicted on display device 502 as 610b. The user can control play of the media content (e.g., video content) using the media out interfaces 610a or 610b. The media out interfaces 610a and 610b can be displayed as partially transparent overlays on the mobile device 501 and the display device 502, respectively. The media out interfaces 610a and 610b can include various user interface elements for controlling media content play, volume, or other settings on the mobile device 501 or display device 502, respectively.

In some implementations, the information or controls included on the media out interfaces displayed on the mobile device 501 are different from the information or controls included on the media out interfaces displayed on the display device 502. In some scenarios, media out interfaces are displayed on both the mobile device 501 and the display device 502. In other scenarios, media out interfaces are only displayed on one of these two devices. Where the media out interfaces are displayed can depend on which device (e.g., the remote control 518 or the mobile device 501) is presently receiving user input.

In the depicted example, media out interface 610b can be used to change a volume, play video content, pause video content, stop video content, skip forward or backward through video content, or move through a list of contents, for example. In general, the user can use a remote control 518 to perform these operations on display device 502. In some implementations, the media out interface 610a or 610b or another interface (e.g., interface 612 on the mobile device 501) can be used to view video time progress (e.g., time remaining in the movie or time elapsed since the beginning of the movie), to move forward or backward in the video (e.g., by sliding a slide bar control), to switch the video content to full screen, or to minimize or close the overlaid displays (e.g., by selecting a Done button). In some implementations, the mobile device 501 can be used as a wireless remote device to perform operations on the display device 502. For example, the user may undock or disconnect the mobile device 501 from the docking device 603 and use the mobile device 501 as a wireless or wired remote control to adjust the play of audio, video, or other content on display device 502.

In some implementations, the video content can be sent over cable 604 as streaming video. For example, the user of mobile device 501 can stream video content from a video sharing website, such as "YouTube.com," for example, by selecting a Web video object (e.g., Web video object 123 of device 101 of FIG. 1B), and further, can display the content on display device 502. The video stream can be accessed over a Wi-Fi connection on mobile device 501, for example. In some implementations, the mobile device 501 can stream video content using a web browser (e.g., Apple Inc.'s Safari™), for example, by selecting a Web object (e.g., Web object 114 of device 101 of FIG. 1B), or other multimedia application (e.g., Apple Inc's Quicktime™). In other implementations, the mobile device can stream media content from an internet radio service, for example. Some, none, or all streamed audio or video content can be forwarded for display to display device 502. For example, the user can configure the mobile device 501 to stream video content when the mobile device 501 is wirelessly connected to the Internet (e.g., via Wi-Fi) and also docked in a docking device 603.

Incoming Phone Call

Figure 7:
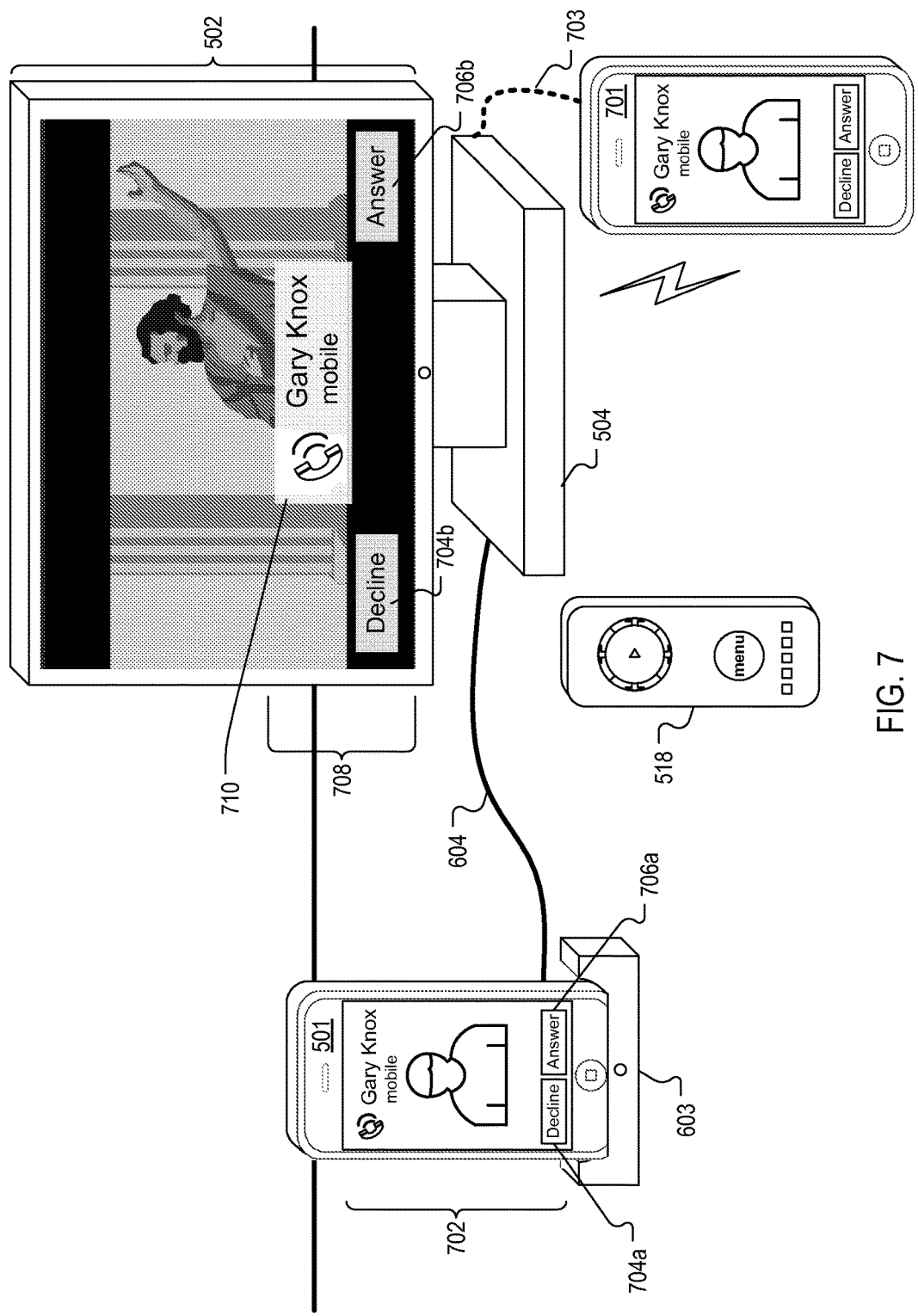
FIG. 7 illustrates the mobile device of FIG. 6 when a call is received.

FIG. 7 illustrates the mobile device 501 of FIG. 6 when a call is received. In the depicted example, mobile device 501 is communicatively coupled to display device 502 through a docking device 603 via cable 604. In other implementations, the mobile device 501 can be coupled directly to cable 604, or wirelessly coupled to display device 502.

In some implementations, the user may be viewing content on display device 502, and at some point, a phone call can be received on mobile device 501. The phone call in this example is from a caller "Gary Knox," who is listed as a contact in the mobile device. The interface 702 on the mobile device 501 displays an image or graphic associated with Gary Knox and his contact information. In addition, the interface 702 includes a decline control 704a to decline the phone call and an answer control 706a to answer the phone call. The user can use mobile device 501 to decline or answer the incoming phone call. In some implementations, the user can use remote control 518 to decline or answer the incoming phone call. For example, the user may use a remote control 518 to connect the phone call through display device 502.

In an example operational mode, when a phone call is received on the mobile device 501, an interface 708 can be displayed on display device 502. The receipt of the phone call can pause playing of media content (e.g., video content) on the display device 502 while the interface 708 is displayed. For example, if mobile device 501 is communicatively coupled with display device 502, the mobile device 501 can pause the video content playing on the display device 502 upon receiving a phone call. The interface 708 can be presented on display device 502 after the video content is paused or concurrently with the video pause. Here, the interface 708 can be displayed as one or more overlays over the paused video content on the display device 502. The interface 708 shown in this example includes a decline button overlay 704b (corresponding to decline button 704a), an answer button overlay 706b (corresponding to answer button 706a), and an information overlay 710 (e.g., a heads-up display (HUD)). The overlays 704b, 706b, and 710 can include one or more of a name, a phone number, a type of phone number, an image, or a graphic, to name a few examples. In the example, the information overlay 710 indicates that a call from Gary Knox is incoming on mobile device 501. As such, the user can use the remote control 518 to select the decline button overlay 704b to decline the incoming phone call or the answer button overlay 706b to accept the incoming phone call. In the event that the user declines the phone call, the movie can continue playing on the display device 502, and the overlays 704b, 706b, and 710 can be removed from the display device 502.

A docked or undocked mobile device 701 can also be operated wirelessly with the display device 502. For example, the user can control display device 502 over a wireless protocol from a physically unconnected mobile device 701. The mobile device 701 may be wirelessly connected to display device 502, and the user can make selections on mobile device 701 that are forwarded to display device 502. For example, the user can make a volume change, fast forward, rewind, stop, pause, or otherwise interact with the content displayed on the display device 502 using mobile device 701 as a wireless remote.

The mobile device 701 can be used as a remote control when the phone call is received. The user can accept the call on the mobile device 701, whether the mobile device 701 is tethered (e.g., through cable 703) to the display device 502 or the mobile device is wirelessly connected to the display device 502. In the event that the user answers the phone call, the video content can remain paused and the phone call can commence.

Connected Phone Call

Figure 8:
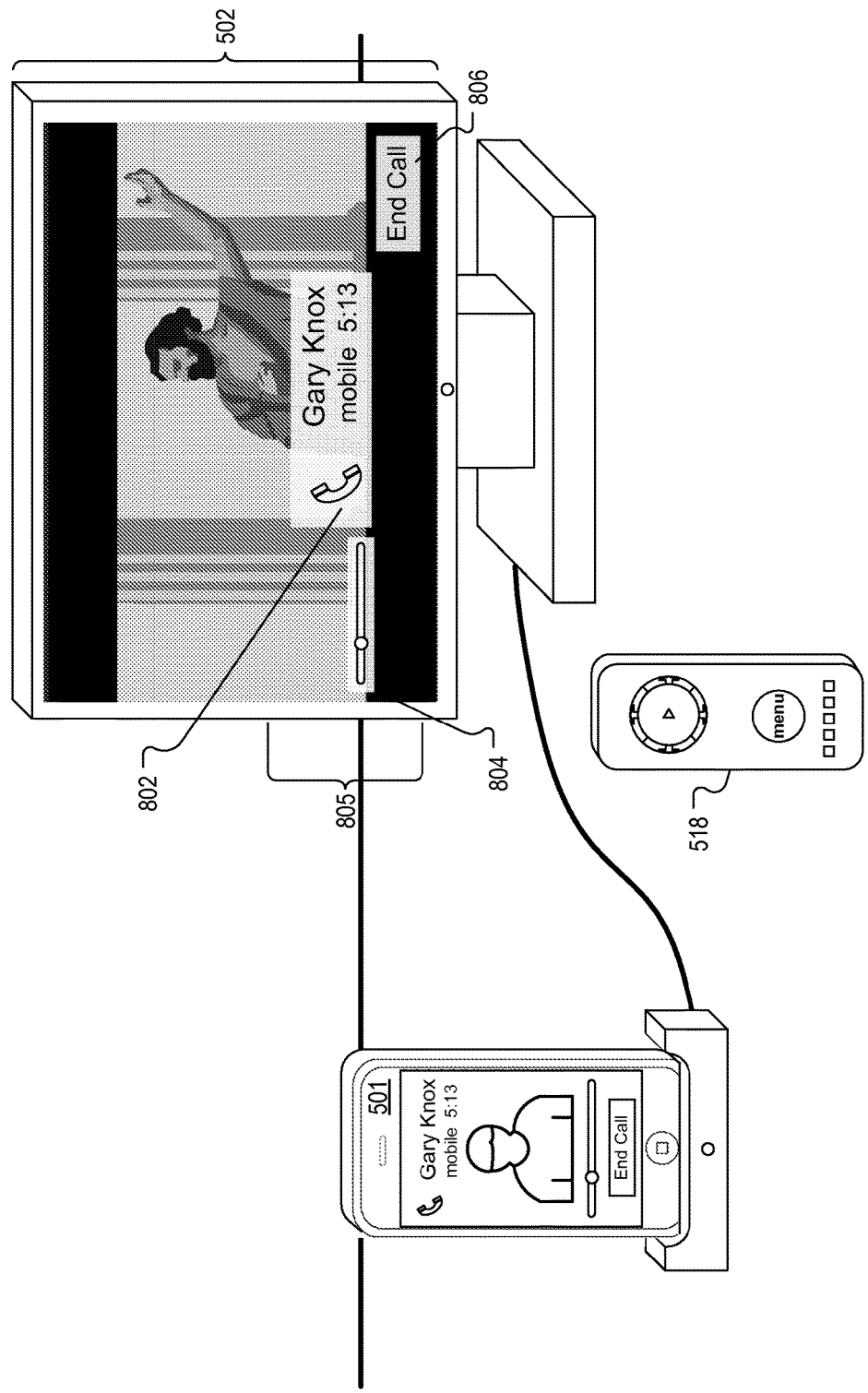
FIG. 8 illustrates the mobile device of FIG. 7 after the received call is connected.

FIG. 8 illustrates the mobile device 501 of FIG. 7 after the received call is connected. Upon connecting, an interface 805 is displayed that can include an overlay 802 (e.g., a HUD) with caller identification, an elapsed time for the call, or other call connection indicators. For example, a phone icon can be shown to indicate the call is in progress. The interface 805 can also include a volume control 804 and an end call button 806. The user can select and slide the volume control 804 to adjust the phone volume up or down using the remote control 518, for example. In the event that the user is using the mobile device 501 undocked, the call can be picked up on the mobile device 501, or via display device 502. During the phone call, the content on display device 502 (behind the interface 805) can remain paused until the user or the caller disconnects the phone call. The user can select the end call button 806 to disconnect the phone call. Upon disconnection of the phone call, the display device 502 can continue playing the video content.

Disconnected Phone Call

Figure 9:
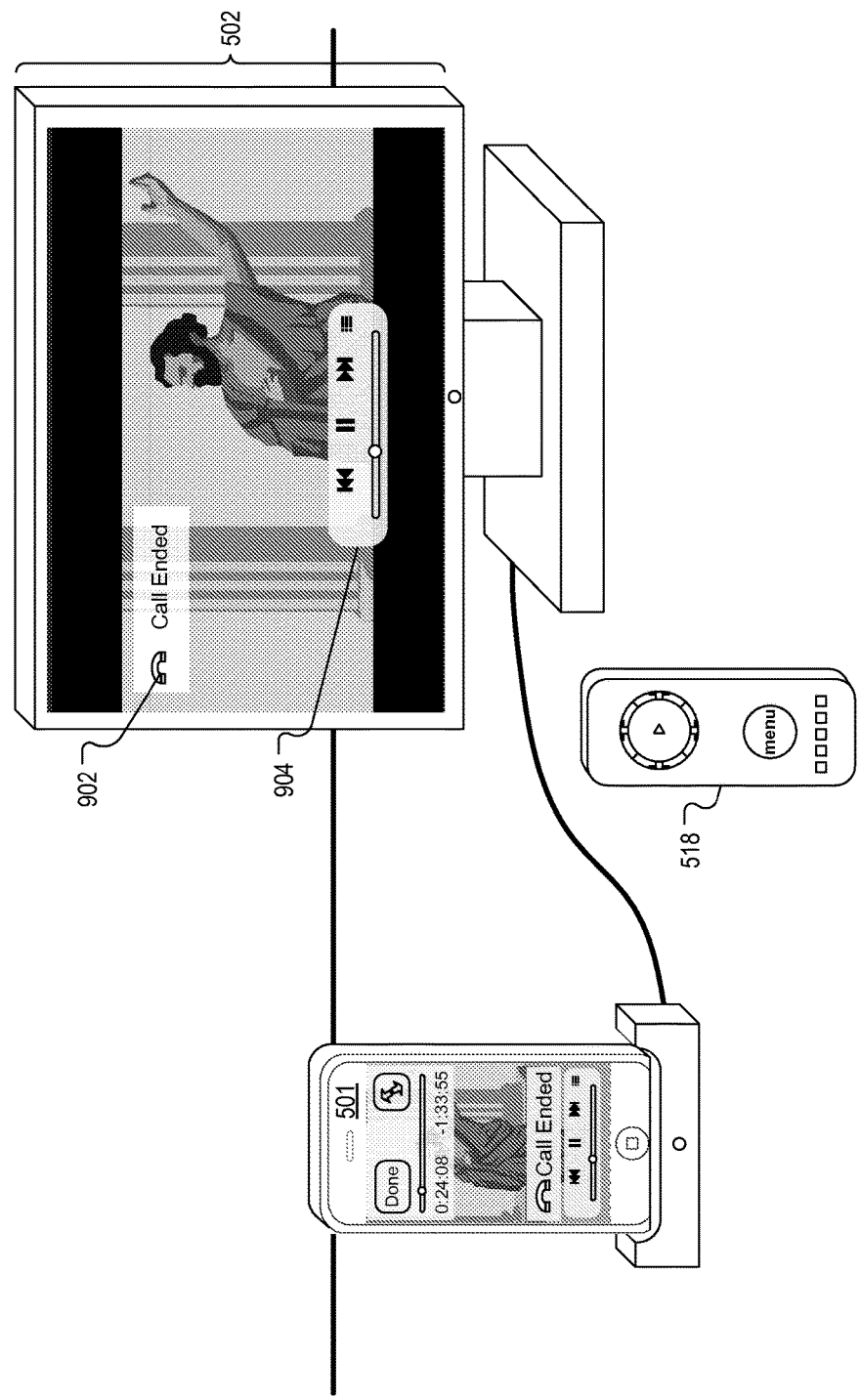
FIG. 9 illustrates the mobile device of FIG. 8 after the call is disconnected.

FIG. 9 illustrates the mobile device 501 of FIG. 8 after the phone call is disconnected. In the example, the overlay 902 indicates that the call has been ended. A media out interface 904 is also displayed and includes media content playback controls. The playback of the video content can be continued after disconnection of the phone call. The user can access the media out interface 904 using remote control 518, for example, to rewind a missed portion, or adjust volume levels. In some implementations, the configuration of an audio output component (e.g., speakers) of the display device 502 may have been modified during the phone call. As such, the audio output components settings may be reset to accept an audio signal from the media content, rather than human voice content.

Figure 10:
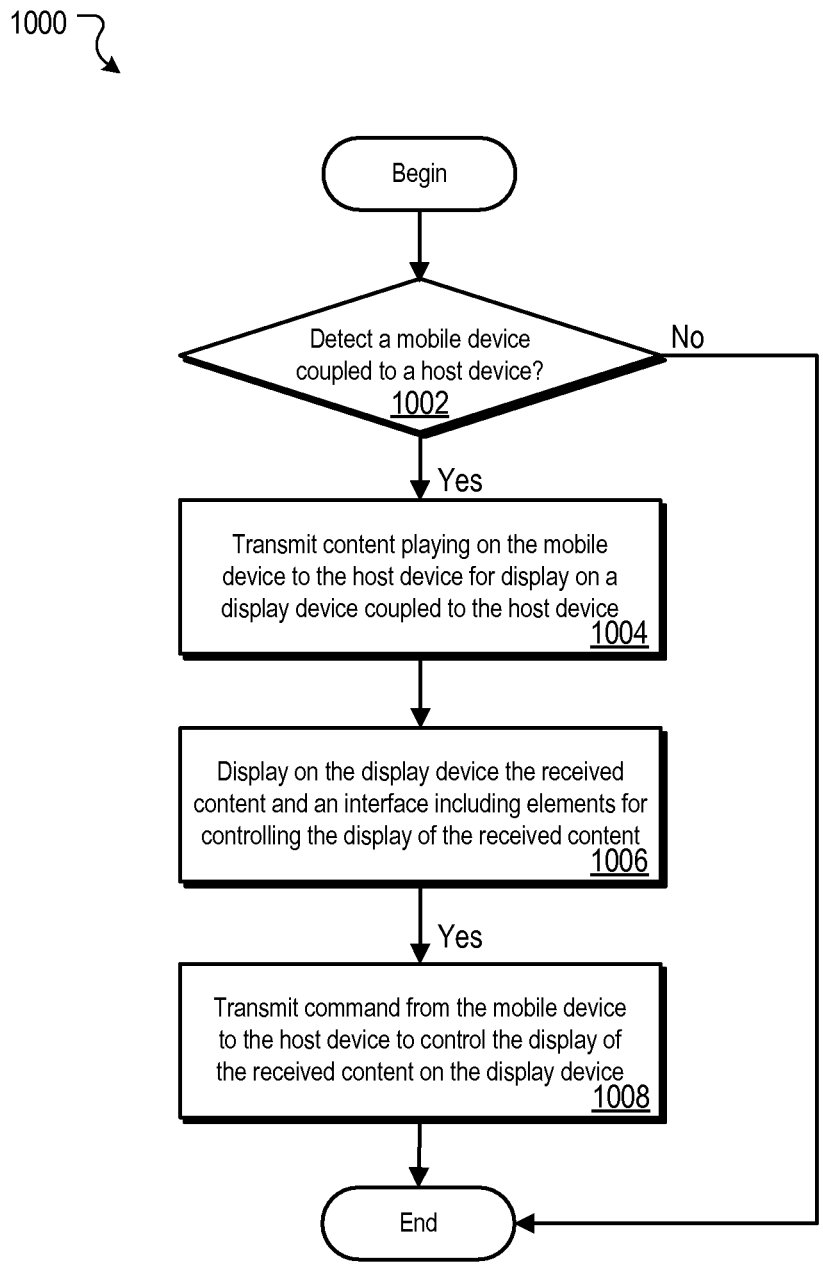
FIG. 10 illustrates an example process for presenting an interface on a display device.

FIG. 10 illustrates an example process 1000 for presenting an interface on a display device. In some implementations, method 1000 can be used on a system that includes a mobile device 100 or 101 coupled to a host device, which is coupled to a display device. Generally, the process 1000 includes detecting a mobile device coupled to a host device and displaying content from the mobile device on a display device coupled to the host device.

The process 1000 begins with detection of a mobile device coupled to a host device (1002). For example, the host device 504 of FIG. 5 can detect that it is coupled to a mobile device 501 of FIG. 5, e.g., when the host device 504 is coupled to the mobile device 501 through a smart cable. Alternatively or in addition, the mobile device 501 can detect that it is coupled to the host device 504, e.g., when the mobile device 501 is coupled to the host device 504 through a smart cable. In some implementations, a dialog box (e.g., dialog box 500a or 500b of FIG. 5) can be displayed on the mobile device 501, a display device 502 of the host device 504, or on both the mobile device 501 and the display device 502 in response to detecting that the mobile device 501 is coupled to the host device 504.

If neither device detects that it is coupled to the other device, the mobile device and the host device can continue to operate independently of one another. If, however, the coupling is detected, the method 1000 can continue and can include the mobile device transmitting content playing on the mobile device to the host device for display on the display device (1004). For example, in FIG. 6, the mobile device 501 can transmit a movie playing on the mobile device 501 to the host device 504 for display on the display device 502. The mobile device 501 can also transmit to the host device 504 for display streaming video, streaming audio, stored audio, digital photographs, or other content (e.g., an email, a webpage, etc.) from applications running on the mobile device 501.

The display device coupled to the host device can display the content received from the mobile device and an interface that includes interface elements, which can be manipulated by commands received from the mobile device or another device (1006). The interface can enable control of the display of the received content displayed on the display device. For example, the media out interface 610b of FIG. 6 can be presented on the display device 502 to receive user input for controlling the display of the movie on the display device 502.

The process 1000 continues when the mobile device transmits one or more commands to the host device to control the display of content displayed on the display device (1008). In some implementations, the commands can be transmitted by the mobile device through a physical link (e.g., the cable 604 of FIG. 6) or through a wireless link (e.g., with infrared signals). In some implementations, the commands for controlling the display are transmitted from a different device, for example, a remote control device (e.g., remote control 518).

Figure 11:
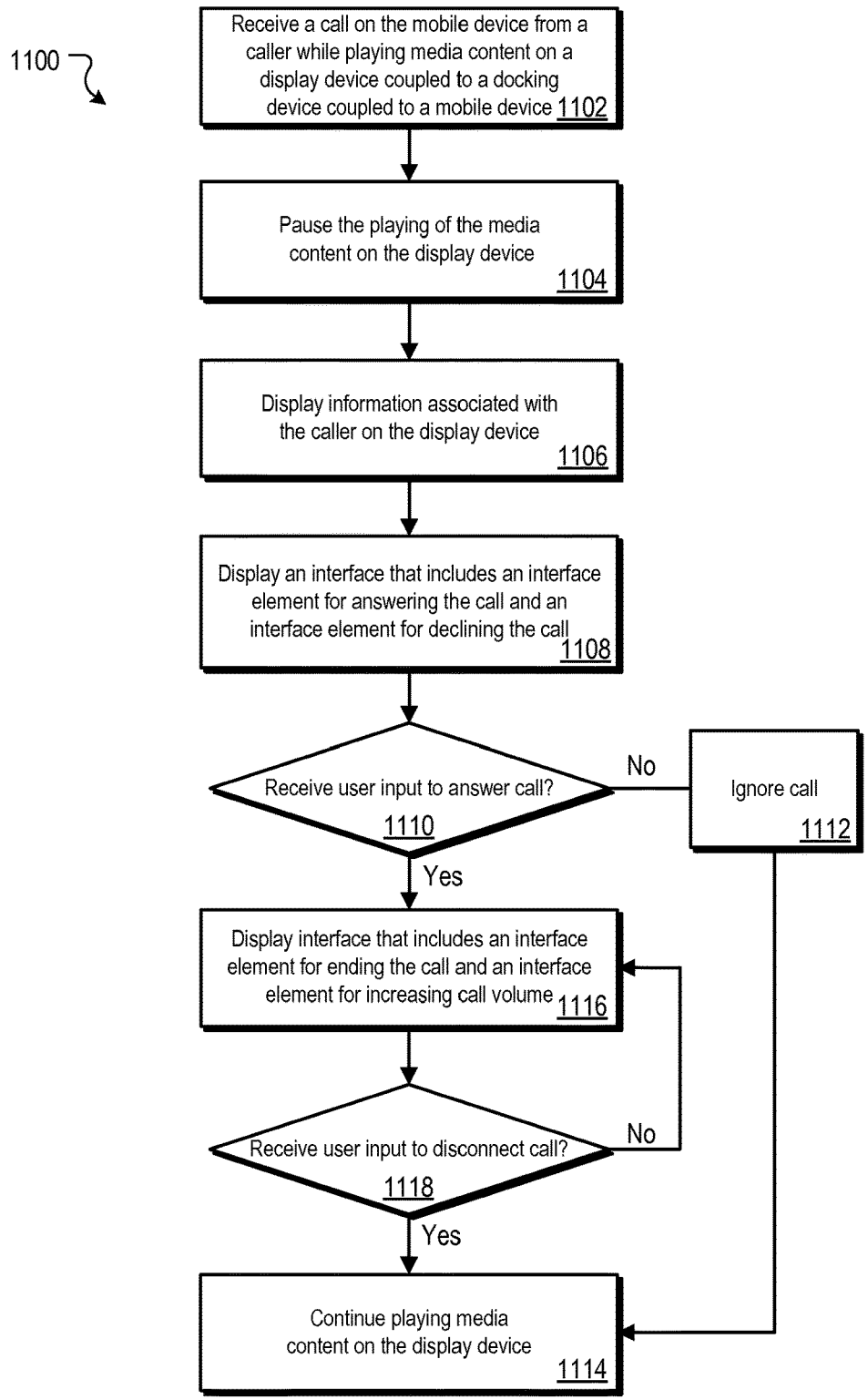
FIG. 11 illustrates an example process for presenting information associated with a caller in an interface on a display device.

FIG. 11 illustrates an example process 1100 for presenting information associated with a caller in an interface on a display device. In some implementations, method 1100 can be used on mobile device 100 or 101. Generally, the process 1100 includes handling an incoming phone call when the mobile device is connected to a display device.

The process 1100 begins when a mobile device receives a call from a caller while playing media content on a display device coupled, by way of a docking device, to a mobile device (1102). For example, mobile device 501 of FIG. 7 can receive an incoming phone call while playing media content on display device 502.

Upon receiving the phone call, the mobile device can automatically pause the playing of the media content on the display device (1104). For example, mobile device 501 can send a pause command over cable 604 to display device 502 upon receiving an incoming phone call.

After receiving the phone call and pausing the display of the media content on the display device, information associated with the caller can be displayed on the display device (1106). For example, mobile device 501 can send caller identification information to display device 502. Additional content can be sent to display device 502. For example, the display device can receive and display an interface element for answering the call and an interface element for declining the call (1108). For example, commands to display a decline button overlay 704b (FIG. 7) for declining the call and an answer button overlay 706b (FIG. 7) for accepting the call can be sent from the mobile device 501 to display device 502 for presentation.

In some implementations, the user can enter an input by selecting the decline button overlay 704b or the answer button overlay 706b. The mobile device 501 can detect whether a user enters an input at the mobile device 501, the remote control 518, or the display device 502, for example. As such, process 1100 can include waiting to receive a user input to answer or decline the received phone call (1110). If the user declines the phone call, the call can be ignored (1112), and the display device can continue playing media content (1114). In the event the user answers the call, the mobile device can modify the interface elements (e.g., interface elements 704b and 706b) to now display an interface element for ending the call (e.g., end call button 806 shown in FIG. 8) and an interface element for controlling aspects of the call (e.g., volume control 804 shown in FIG. 8) (1116).

At some point, the user can complete the phone call and may wish to disconnect. During the time the phone call is in progress, the display device 502 can continue to display buttons 804 and 806, for example. If the user chooses to disconnect the call by selecting the end call interface element, the display device can disconnect the phone call, hide the interface elements, and continue playing media content on the display device 502 (1114).

Although the figures depicted in this disclosure relate to receiving phone call information in a display external to the mobile device receiving the phone call, other information and content from the mobile device 100 or 101 can be received in one or more external display devices coupled to the mobile device 100 or 101, respectively. For example, if the battery is low on an un-tethered (e.g., wirelessly operated) mobile device, a dialog box can be displayed on the wirelessly connected display device indicating the low battery. In another example, email content or SMS text content received on mobile device 100 or 101 can be displayed as overlays or HUDs over other content displayed on a coupled display device.

Content from applications running on the mobile device 100 or 101 can also be displayed on a coupled external display device. Examples include content from internet browsing, an instant message, a calendar, an address book, a calculator or spreadsheet, a notebook, a clock, a map, a digital photo album, preference setting, internet shopping information, a weather application, and a stock quote application. In some implementations, one or more interfaces, dialog boxes, or HUDs can overlay mobile device content displayed on the external display device, where the interfaces, dialog boxes, or HUDs include information or controls related to the displayed mobile device content. In some implementations, other operating, setup, event, or help information of mobile device 100 or 101 can be displayed to the user in a coupled external display device.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   detecting, by a host device, a mobile device coupled to the host device, wherein the mobile device is capable of storing media content;
   receiving, at the host device, media content from the mobile device;
   displaying the received media content at the host device;
   receiving data at the host device, wherein the data corresponds to a command received at a media out interface displayed by the mobile device, wherein the media out interface is only displayed on the mobile device, and wherein the command is associated with the content being received at the host device;
   controlling the content displayed at the host device using the data received from the mobile device; and
   determining, based on a configuration of the mobile device, to not interrupt the media content displayed at the host device when incoming mobile device communication content is received at the mobile device;
   wherein, in response to the determination to not interrupt the content displayed at the host device, the incoming mobile device communication content is not displayed by the host device.

2. The method of claim 1, wherein the media out interface receives commands including at least one of: changing a volume level, pausing, stopping, skipping to another point in the media content, and skipping to other media content.

3. The method of claim 1, further comprising receiving, from the mobile device, data corresponding to an incoming phone call received at the mobile device.

4. The method of claim 3, further comprising pausing the media content displayed by the host device when the data corresponding to the incoming phone call is received from the mobile device.

5. The method of claim 4, further comprising:
   receiving, from the mobile device, data corresponding to a phone call disconnection by the mobile device; and
   continuing playback of the paused media content displayed by the host device.

6. The method of claim 3, further comprising displaying, by the host device, a phone call graphical interface, wherein the phone call graphical interface is displayed over at least a part of the received media content.

7. The method of claim 1, wherein the incoming mobile device communication content is at least one of a received phone call, a received e-mail, or a received SMS.

8. A computer-implemented system, comprising:
   one or more data processors; and
   one or more non-transitory computer-readable storage media containing instructions configured to cause the one or more processors to perform operations including:
   detecting, by a host device, a mobile device coupled to the host device, wherein the mobile device is capable of storing media content;
   receiving, at the host device, media content from the mobile device;
   displaying the received media content at the host device;
   receiving data at the host device, wherein the data corresponds to a command received at a media out interface displayed by the mobile device, wherein the media out interface is only displayed on the mobile device, and wherein the command is associated with the content being received at the host device; and
   controlling the content displayed at the host device using the data received from the mobile device; and
   determining based on a configuration of the mobile device, to not interrupt the media content displayed at the host device when incoming mobile device communication content is received at the mobile device;
   wherein, in response to the determination to not interrupt the content displayed at the host device, the incoming mobile device communication content is not displayed by the host device.

9. The computer-implemented system of claim 8, wherein the media out interface receives commands including at least one of: changing a volume level, pausing, stopping, skipping to another point in the media content, and skipping to other media content.

10. The computer-implemented system of claim 8, further comprising instructions configured to cause the one or more processors to perform operations including receiving, from the mobile device, data corresponding to an incoming phone call received at the mobile device.

11. The computer-implemented system of claim 10, further comprising instructions configured to cause the one or more processors to perform operations including pausing the media content displayed by the host device when the data corresponding to the incoming phone call is received from the mobile device.

12. The computer-implemented system of claim 11, further comprising instructions configured to cause the one or more processors to perform operations including:
   receiving, from the mobile device, data corresponding to a phone call disconnection by the mobile device; and
   continuing playback of the paused media content displayed by the host device.

13. The computer-implemented system of claim 10, further comprising instructions configured to cause the one or more processors to perform operations including displaying, by the host device, a phone call graphical interface, wherein the phone call graphical interface is displayed over at least a part of the received media content.

14. The computer-implemented system of claim 8, wherein the incoming mobile device communication content is at least one of a received phone call, a received e-mail, or a received SMS.

15. A non-transitory machine memory including instructions configured to cause a data processing apparatus to:

detect, by a host device, a mobile device coupled to the host device, wherein the mobile device is capable of storing content;

receive, at the host device, content from the mobile device;

display the received content at the host device;

receive data at the host device, wherein the data corresponds to a command received at a media out interface displayed by at the mobile device, wherein the media out interface is only displayed on the mobile device, and wherein the command is associated with the content being received at the host device;

control the content displayed at the host device using the data received from the mobile device; and determine, based on a configuration of the mobile device, to not interrupt the media content displayed at the host device when incoming mobile device communication content is received at the mobile device;

wherein, in response to the determination to not interrupt the content displayed at the host device, the incoming mobile device communication content is not displayed by the host device.

16. The non-transitory memory of claim 15, wherein the content received from the mobile device is media content, and the graphical interface receives commands including at least one of: changing a volume level, pausing, stopping, skipping to another point in the media content, and skipping to other media content.

17. The non-transitory memory of claim 15, further comprising instructions configured to cause the data processing apparatus to receive, from the mobile device, data corresponding to an incoming phone call received at the mobile device.

18. The non-transitory memory of claim 17, further comprising instructions configured to cause the data processing apparatus to pause the media content displayed by the host device when the data corresponding to the incoming phone call is received from the mobile device.

19. The non-transitory memory of claim 18, further comprising instructions configured to cause the data processing apparatus to:

receive, from the mobile device, data corresponding to a phone call disconnection by the mobile device; and continue playback of the paused media content displayed by the host device.

20. The non-transitory memory of claim 17, further comprising instructions configured to cause the data processing apparatus to display, by the host device, a phone call graphical interface, wherein the phone call graphical interface is displayed over at least a part of the received media content.

21. The non-transitory memory of claim 15, wherein the incoming mobile device communication content is at least one of a received phone call, a received e-mail, or a received SMS.

* * * * *

UNITED STATES PATENT AND TRADEMARK OFFICE
CERTIFICATE OF CORRECTION

PATENT NO. : 10,091,345 B2
APPLICATION NO. : 11/849911
DATED : October 2, 2018
INVENTOR(S) : Imran A. Chaudhri et al.

Page 1 of 1

It is certified that error appears in the above-identified patent and that said Letters Patent is hereby corrected as shown below:

In the Claims

Claim 15, (Column 24, Line 66, (approx.)): please delete "machine".

Signed and Sealed this
Twenty-seventh Day of November, 2018

Andrei Iancu
*Director of the United States Patent and Trademark Office*